United States Patent [19]

Antonetti et al.

[11] 4,141,691

[45] Feb. 27, 1979

[54] USE OF WATER SOLUBLE POLYMERS IN COAL FLOTATION CIRCUITS

[75] Inventors: Joseph M. Antonetti, Burgettstown, Pa.; Glen F. Snow, Birmingham, Ala.

[73] Assignee: Calgon Corporation, Pittsburgh, Pa.

[21] Appl. No.: 860,010

[22] Filed: Dec. 12, 1977

[51] Int. Cl.[2] .......................... C10L 9/10; B01D 11/00

[52] U.S. Cl. ........................................ 44/1 R; 210/54

[58] Field of Search ............... 44/1 R, 1 A, 6; 210/54

[56] References Cited

U.S. PATENT DOCUMENTS

| | | | |
|---|---|---|---|
| 3,147,218 | 9/1964 | Booth et al. | 210/54 |
| 3,252,769 | 5/1966 | Nagelvoort | 44/1 R |
| 4,033,729 | 7/1977 | Capes et al. | 44/6 X |
| 4,076,505 | 2/1978 | Dessau | 44/1 R |

*Primary Examiner*—Carl Dees

*Attorney, Agent, or Firm*—Mario A. Monaco; Martin L. Katz

[57] ABSTRACT

Use of cationic water soluble polymers in coal flotation circuits to improve the recovery of clean coal and reduce the ash content.

3 Claims, No Drawings

USE OF WATER SOLUBLE POLYMERS IN COAL FLOTATION CIRCUITS

BACKGROUND OF THE INVENTION

Flotation processes have been used for some time in the coal industry to recover coal fines from previously discarded aqueous streams generated by processing raw coal. Generally, the flotation feed in a coal preparation plant comes from the fines and clays being washed away from the coarse fraction of coal which has been processed through dewatering screens, sieve bins, classifier tanks and hydrocyclones. The feed is normally 28 × 0 mesh and contains 4 to 12% solids.

The flotation circuit consists of four to eight cells in a single bank with the number of banks proportional to the total tonnage to be processed. The concentrate produced in the flotation cells goes to a vacuum filter where it is concentrated to approximately 75 to 80% solids. The tailings from the flotation process are discharged to a waste pond or a refuse vacuum filter. During the flotation process, the very fine clay that is in the circuit often becomes entrapped in the coal being floated and increases the amount of ash in the final product.

Accordingly, it is an object of this invention to improve the operation of the coal flotation circuit by improving the overall yield of coal.

It is another object of this invention to improve the operation of the coal flotation circuit by decreasing the ash content of the coal.

These and other objects of this invention are accomplished by the addition of cationic water soluble polymers to coal flotation circuits.

DETAILED DESCRIPTION OF THE INVENTION

The polymer may be added to the feed to the flotation circuit by conventional feeding means and it is believed that it functions by flocculating the fine fraction of the clay. The polymer may be used in dosages of between 0.025 and 1 pound per ton, preferably at least 0.05 pounds per ton, based on the weight of the dry flotation feed.

Suitable polymers which may be used in accordance with the teachings of this invention include any water soluble cationic polymer. Preferred polymers include polymers of diallyl dialkyl ammonium halides, particularly homo- and copolymers of diallyl dimethyl ammonium chloride. Also useful are condensation polyamines, as for example those prepared by the reaction of ammonia, a primary amine or a secondary amine with various difunctional alkylating agents such as ethylenedichloride and epichlorohydrin. Polymers of this class are disclosed in U.S. Pat. Nos. 3,894,948, 3,741,891, 3,738,945 and 3,567,659. Also useful in the practice of this invention are cationic polymers such as poly(vinylimidazoline), poly(2-vinylimidazolinium) bisulfate, poly(3-acrylamidopropyldimethylamine) and its acid neutralized salts, poly(3-acrylamidopropyltrimethylammonium chloride), poly(methacryloloxyethyltrimethylammoniummethosulfate) or the corresponding chloride, the reaction product of polyacrylamide, formaldehyde and dimethylamine, the reaction product of dimethylamine and 1,4-dichloro-2-butene, the reaction product of trimethylamine and poly(epichlorohydrin) and homo- or copolymers of 3-methacryloxy-2-hydroxypropyltrimethylammoniumchloride. When copolymers of the above monomers are prepared, it is contemplated that the copolymers will contain up to 60% by weight acrylamide or other olefinic monomer and at least 40% by weight of the cationic monomer.

The molecular weight of the polymers useful in accordance with the teachings of the present invention should be at least 5,000 and preferably at least 20,000.

The following examples will illustrate this invention.

EXAMPLE 1

A series of flotation tests were conducted using a low viscosity poly(dimethyl diallyl ammonium chloride) as an additive. The objectives of the test were to reduce the ash in the clean coal, increase the percent recovery of the coal and reduce the amount of fuel oil being used in the flotation circuit. The polymer used in these tests was a 20 percent by weight aqueous solution of a homopolymer of dimethyl diallyl ammonium chloride having a molecular weight of 40,000. The results of these tests are set forth in Table I.

Table I

Flotation Conditions for Tests 1 through 4

| | |
|---|---|
| Cell Speed | 1800 RPM |
| Condition Time | 30 sec. |
| Float Time | 90 sec. |
| Raw Ash | 37.17% |
| pH | 8.2 |
| Feed Solids | 4.5% |
| Screen Analysis | |
| +40 mesh | 93.52% |
| −40 mesh | 6.48% |

| Test No. | Dosage | % Ash |
|---|---|---|
| 1 | 3 drops alcohol<br>.72 ml fuel oil | 13.84 |
| 2 | 3 drops alcohol<br>.18 ml fuel oil<br>10 ppm polymer | 13.3 |
| 3 | 3 drops alcohol<br>.07 ml fuel oil<br>10 ppm polymer | 13.42 |
| 4 | 3 drops alcohol<br>0 ml fuel oil<br>10 ppm polymer | 15.38 |

Flotation Conditions for Tests 5 through 14

| | |
|---|---|
| Cell Speed | 1800 RPM |
| Condition Time | 30 sec. |
| Float Time | 90 sec. |
| Feed Solids | 8.1% |
| Raw Ash Analysis | 40.45% |
| pH | 8.2 |

| Test No. | Dosage | % Ash | % Wt. Recovery |
|---|---|---|---|
| 5 | 3 drops alcohol<br>.72 ml fuel oil | 14.58 | 51.7 |
| 6 | 3 drops alcohol (conc.)<br>.72 ml fuel oil (conc.)<br>15 ppm polymer | 12.32 | 49.8 |
| 7 | 3 drops alcohol<br>.36 ml fuel oil | 12.60 | 47.8 |
| 8 | 3 drops alcohol<br>.36 ml fuel oil<br>15 ppm polymer | 12.52 | 54.1 |
| 9 | 3 drops alcohol<br>.18 ml fuel oil | 12.04 | 46.6 |
| 10 | 3 drops alcohol<br>.18 ml fuel oil<br>15 ppm polymer | 13.61 | 56.4 |
| 11 | 3 drops alcohol<br>.072 ml fuel oil | 12.11 | 46.3 |
| 12 | 3 drops alcohol<br>.072 ml fuel oil<br>15 ppm polymer | 15.25 | 52.3 |
| 13 | 3 drops alcohol<br>no fuel oil | 10.78 | 35.2 |
| 14 | 3 drops alcohol<br>no fuel oil<br>15 ppm polymer | 14.25 | 48.1 |

Flotation Conditions for Tests 15 through 18

| | |
|---|---|
| Cell Speed | 1800 RPM |
| Condition Time | 30 sec. |
| Float Time | 90 sec. |

Table I-continued

| | | | |
|---|---|---|---|
| Feed Solids | | 4.5% | |
| Ash | | 40.45% | |
| pH | | 8.2 | |
| Test No. | Dosage | % Ash | % Wt. Recovery |
| 15 | 3 drops alcohol .18 ml fuel oil | 11.65 | 41.3 |
| 16 | 3 drops alcohol .18 ml fuel oil 15 ppm polymer | 12.35 | 51.1 |
| 17 | 2 drops alcohol followed 30 sec. later by 1 drop .18 ml fuel oil | 12.0 | 39.8 |
| 18 | 2 drops alcohol followed 30 sec. later by 1 drop .18 ml fuel oil | 11.4 | 46.6 |

EXAMPLE 2

A low viscosity poly(dimethyl diallyl ammonium chloride) was added to the flotation circuits at a coal recovery plant. The results are as follows:

| | |
|---|---|
| Normal operation with 40 ml/minute of alcohol (methyl isobutyl carbinol) and 2,000 ml/minute of fuel oil. | |
| Moisture | 29% |
| Ash | 20% |

-continued

| | |
|---|---|
| Btu's | 9000 |
| Sulfur | — |
| Polymer addition with 1,890 ml/minute, 40 ml/minute alcohol (MIBC) and 500 ml/minute fuel oil. | |
| Moisture | 26% |
| Ash | 11.9% |
| Btu's | 13,700 |
| Sulfur | — |

EXAMPLE 3

Laboratory flotation tests were conducted with a three liter Wemco Flotation Machine at a speed of 1800 rpm, a conditioning time of 30 seconds and a flotation time of 60 seconds. A low viscosity poly(dimethyl diallyl ammonium chloride) was used in these tests and the results are set forth in Tables II and III.

Table II pH = 7.0

| Raw Feed | |
|---|---|
| Ash | 28.36% |
| Sulfur | 2.63% |
| Feed Solids | 3.6% |

| | Run #1 | Run #2 | Run #3 | Run #4 | Run #5 | Run #6 | Run #7 | Run #8 |
|---|---|---|---|---|---|---|---|---|
| MIBC* | 0.122 #/T | 0.128 #/T | 0.075 #/T | 0.076 #/T | 0.172 #/T | 0.170 #/T | 0.220 #/T | 0.223 #/T |
| Polymer | — | 0.280 #/T | — | 0.279 #/T | — | 0.267 #/T | — | 0.273 #/T |
| Clean Coal (ash) | 11.53% | 10.30% | 12.12% | 11.84% | 11.70% | 12.96% | 12.90% | 12.57% |
| Tails (ash) | 36.66% | 37.78% | 32.32% | 34.88% | 44.76% | 47.18% | 56.10% | 55.22% |
| % Recovery | 35.72% | 33.69% | 17.19% | 22.54% | 44.32% | 51.73% | 60.72% | 60.44% |

*MIBC = methyl isobutyl carbinol

Table II pH = 7.1

| Raw Feed | | |
|---|---|---|
| Ash | 32.03% | |
| Sulfur | 2.17% | |
| Feed Solids | 6.9% | (Runs 1-6) |
| | 3.5% | (Run 7) |

| | Run #1 | Run #2 | Run #3 | Run #4 | Run #5 | Run #6 | Run #7 |
|---|---|---|---|---|---|---|---|
| MIBC* | 0.211 #/T | 0.207 #/I | 0.251 #/T | 0.244 #/T | 0.237 #/T | 0.241 #/T | 0.239 #/T |
| Polymer | — | 0.142 #/T | — | 0.149 #/T | 0.072 #/T | 0.221 #/T | — |
| Clean Coal (ash) | 15.56% | 16.36% | 16.23% | 16.52% | 16.33% | 15.78% | 14.31% |
| Tails (ash) | 66.71% | 72.29% | 77.69% | 76.10% | 77.05% | 70.45% | 71.49% |
| % Recovery | 67.15% | 70.90% | 70.70% | 71.60% | 72.20% | 68.20% | 66.30% |

*MIBC = methyl isobutyl carbinol

We claim:

1. A process for improving the recovery of clean coal from flotation circuits which comprises adding an effective amount of a water soluble cationic polymer to the coal being processed to decrease the amount of clay in the aqueous coal suspension being treated.

2. A process as in claim 1 wherein the effective amount is at least 0.025 pounds per ton based on the weight of the dry flotation feed.

3. A process as in claim 1 wherein the polymer is poly(dimethyl diallyl ammonium chloride).

* * * * *

Notice of Adverse Decision in Interference

In Interference No. 100,425, involving Patent No. 4,141,691, J. M. Antonetti, and G. F. Snow, USE OF WATER SOLUBLE POLYMERS IN COAL FLOTATION CIRCUITS, final judgment adverse to the patentees was rendered July 24, 1980, as to claims 1 and 2.

[*Official Gazette September 30, 1980.*]

Disclaimer

4,141,691.—*Joseph M. Antonetti,* Burgettstown, PA. and *Glen F. Snow,* Birmingham, Ala. USE OF WATER SOLUBLE POLYMERS IN COAL FLOTATION CIRCUITS. Patent dated Feb. 27, 1979. Disclaimer filed Aug. 8, 1980, by the assignee, *Calgon Corp.*

Hereby enters this disclaimer to all claims of said patent.

[*Official Gazette October 26, 1982.*]